(12) United States Patent
Frisky et al.

(10) Patent No.: US 7,759,536 B2
(45) Date of Patent: Jul. 20, 2010

(54) IN-SITU SALT REMEDIATION AND GROUND HEATING TECHNOLOGY

(75) Inventors: Sean Frisky, Regina (CA); Joel Wolensky, Regina (CA); Jason Beaudin, Regina (CA); Justin Lee, Regina (CA); Andy Wievre, Regina (CA)

(73) Assignee: Ground Effect Environmental Services, Inc., Regina, Saskatchewan (CA)

( * ) Notice: Subject to any disclaimer, the term of this patent is extended or adjusted under 35 U.S.C. 154(b) by 538 days.

(21) Appl. No.: 11/809,360

(22) Filed: May 31, 2007

(65) Prior Publication Data

US 2008/0132746 A1 Jun. 5, 2008

(30) Foreign Application Priority Data

May 31, 2006 (CA) .................................. 2549198

(51) Int. Cl.
*A62D 3/115* (2007.01)

(52) U.S. Cl. ...................................... 588/303; 588/405

(58) Field of Classification Search ................. 588/303, 588/405, 410, 900
See application file for complete search history.

(56) References Cited

U.S. PATENT DOCUMENTS 6,210,078 B1 * 4/2001 Redwine et al. ............. 405/263

* cited by examiner

*Primary Examiner*—Edward M Johnson
(74) *Attorney, Agent, or Firm*—Patterson, Thuente, Christensen, Pedersen, P.A.

(57) ABSTRACT

A method for in-situ soil remediation is provided. Electrodes are placed below the ground surface extending horizontally. The electrodes are positioned such that a first electrode is positioned above a second electrode and the electrodes surround a region of soil containing contaminants. A plurality of electrodes can be placed in an upper plane corresponding with a plurality of electrodes placed in a lower plane. By passing a current between the electrodes contaminants are mobilized towards the electrodes where the contaminants can be extracted. The electrodes are constructed by boring substantially horizontal bore holes, inserting a well screen in the bore hole and packing an annulus formed between the well screen and the bore hole with electrically conductive particulate matter.

32 Claims, 5 Drawing Sheets

IN-SITU SALT REMEDIATION AND GROUND HEATING TECHNOLOGY

RELATED APPLICATION

The present application claims priority to Canadian Application No. 2,549,198 filed May 31, 2006, which is incorporated herein in its entirety by reference.

FIELD OF INVENTION

This invention is in the field of soil remediation and more particularly in-situ electrokinetic remediation.

BACKGROUND OF THE INVENTION

Contamination of subsurface soils is a matter of great concern and can cause many environmental problems if left in the subsurface soil. This contamination of subsurface soil can occur in a number of ways, such as accidental spills, leaks from storage facilities or tanks (in the past, it was not uncommon for gasoline storage tanks under service stations to leak and contaminate the soil beneath the storage tanks), landfill seepage, etc. Sometimes the contamination is a result of an industrial process or resource extraction.

In most circumstances it is desirable or even necessary to deal with the subsurface soil contamination. Sometimes clean-up of the contamination is even required by regulation.

The most basic method of treating contaminated subsurface soil is also the most labor intensive; simply excavating the contaminated soil and hauling it off-site for disposal, such as by incineration. The problem with this method is that although it is straightforward and rather uncomplicated, it is very labor and resource intensive. Because this method is so labor intensive and uneconomical in all but the rarest circumstances, there have been numerous attempts at developing in-situ soil remediation, where the contamination is addressed in the subsurface soil without having to make extensive excavations. Of these in-situ soil remediation methods, various methods have been tried or used such as injection techniques, where chemicals or biological agents are injected in-situ in the soil to treat the contaminant within the subsurface soil.

One of the more popular in-situ soil remediation methods that is commonly used is soil vapor extraction or SVE. SVE applies a vacuum to a well hole drilled vertically in to the contaminated subsurface soils. When the vacuum is applied, air is forced to travel through the pore spaces in the soil, causing liquid in the soil to volatize and be carried out. The air carries the volatized contaminants and the volatized contaminants are removed from the well hole by the vacuum created. The extracted gases are then either vented to atmosphere or into a containment system for later treatment.

However SVE works best in highly permeable soils because it allows a greater area around the well bore to be treated by the SVE. The more permeable the soil, the greater the area of surrounding soil that will allow volatized contaminants to be drawn out by the vacuum created in the well hole. The less permeable the soil, the smaller the area of subsurface soil around the well hole that will be treated by the SVE and the effectiveness of SVE methods will quickly diminish in less permeable soils.

To increase the effectiveness of soil vapor extraction methods, a number of different methods have been tried and used to try to increase the effective range of these soil vapor extraction methods surrounding the down hole. Because of this requirement that the subsurface soil have relatively high permeability for SVE to be really effective, a number of methods and treatments have been used to try and increase the permeability of the soil surrounding the well hole. Some of these methods include: pneumatic fracturing where air is forced down the well hole in pressure waves in an attempt to create fractures in the surrounding soil to increase the permeability of the soil; and heat treating methods to decrease the viscosity and increase the volatility of fluids in the soil.

In an effort to increase the effects of soil vapor extraction electric soil heating systems have been tried. Soil heating imparts an electrical field across a contamination zone to cause contaminants to move towards the electrodes. However, previous attempts have not had very consistent or promising results.

SUMMARY OF THE INVENTION

It is an object of the present invention to overcome problems in the prior art.

In a first aspect, a method for in-situ soil remediation is provided. The method comprises: placing a first electrode below a ground surface, the first electrode extending substantially horizontally; placing a second electrode below the first electrode, the second electrode extending substantially horizontally, soil between the first electrode and second electrode containing contaminants; and passing an electric current between the first electrode and second electrode through the soil between the first electrode and second electrode, using the first electrode and second electrode, the first electrode having opposite charge from the second electrode, to induce mobilization of contaminants in the soil between the first electrode and second electrode towards at least one of: the first electrode and second electrode.

In a second aspect, a method for in-situ soil remediation is provided. The method comprises: horizontally boring a first bore hole below a ground surface, the first bore hole extending substantially horizontally; horizontally boring a second bore hole below the first bore hole, the second bore hole extending substantially parallel to the first bore hole, soil between the first bore hole and second bore hole containing contaminants; inserting a first well screen in the first bore hole, a cross-sectional area of the first well screen being less than a cross-sectional area of the first bore hole; inserting a second well screen in the second bore hole, a cross-sectional area of the second well screen being less than a cross-sectional area of the second bore hole; filling an annuls formed between the first well screen and the first bore hole with electrically conductive particulate matter to form a first electrode; filling an annuls formed between the second well screen and the first bore hole with electrically conductive particulate matter to form a second electrode; and passing an electric current between the first electrode and second electrode through the soil between the first bore hole and second hole, the first electrode having opposite charge from the second electrode, to induce mobilization contaminants in the soil between the first electrode and second electrode towards at least one of: the first electrode and second electrode.

In a third aspect, a method of constructing an electrode for electro-kinetic in-situ remediation of soil with an expanded cross-section is provided. The method comprises: creating a bore hole through soil beneath a ground surface; inserting a well screen in the bore hole, the well screen having a cross-section that is less than a cross-section of the bore hole; and filling an annulus formed between the an outside surface of the well screen and an inner surface of the bore hole with a electrically-conductive granular material.

In a fourth aspect, a method of constructing an electrode for electro-kinetic in-situ remediation of soil with an expanded cross-section is provided. The method comprises: creating a bore hole through soil beneath a ground surface; inserting a well screen in the bore hole, the well screen having a cross-section that is less than a cross-section of the bore hole; and filling an annulus formed between the an outside surface of the well screen and an inner surface of the bore hole with a electrically-conductive granular material.

The present invention, in one aspect, is a method of removing contaminants from subsurface soil. A first set of horizontal bore holes are bored under a ground surface in subsurface soil, typically above a contamination zone. These bore holes will form a first set of horizontal bore holes located beneath the ground surface and oriented in a first plane. Next, a second set of horizontal bore holes are bored under a ground subsurface and below the first set of horizontal bore holes. Typically, the second set of bore holes are located either partially through or entirely below the contamination zone so that at least a part of the contamination zone is situated between the first and second set of horizontal bore holes. The second set of horizontal bore holes are oriented in a second plane which is substantially parallel to the first plane containing the first set of horizontal bore holes.

Each of the bore holes are bored with a horizontal boring tool. When the horizontal boring tool reaches the surface at a far end of the bore hole, a well screen is attached to the end of the boring tool. When the horizontal boring tool is retracted back through the bore hole, the well screen is pulled back into the bore hole.

When each of the bore holes are drilled and a well screen is positioned in each of the bore holes, the annulus of each of the bore holes surrounding the well screen will be injected full of an electrically-conducting particulate matter, so that the entire well bore forms an electrode. Optionally, a conductor, such as a copper wire, is positioned running along the outside of the well screen and running the entire length of the well screen. In this manner, if an air pocket occurs in the annulus of the well bore where no electrically-conducting particulate matter is present, an electrical current will be carried by the conductor across the air pocket to the electrically-conducting particulate on the other side of the electrically-conducting particulate.

At this point, the first set of horizontal bore holes and the second set of horizontal bore holes are packed with an electrically-conducting particulate matter to form a number of relatively large upper and lower electrodes, respectively, running substantially horizontal under the ground surface in the subsurface soil with the upper electrodes running substantially parallel to the lower electrodes.

Next, a power delivery system is connected across the upper and lower electrodes, so that when a voltage is supplied across first and the second set of bore holes, an electrical field will be created between the upper and lower electrodes and through at least a portion of the contamination zone.

If the contaminant, in the contamination zone, is salt, heavy metals, radionuclides or organic compounds, ions present in the contamination zone will move, as a result of electromigration, towards the respective electrodes in an anode-cathode reaction. For example, if the contaminant in the contamination zone is salt, sodium ions and chlorine ions are present in relatively large concentrations in the contamination zone. When a voltage is supplied to the electrodes and an electric field is created across the contamination zone, the sodium ions will migrate towards the cathode or negatively charged electrode and the chlorine ions will migrate towards the anode or the positively charged electrode.

This movement of ions to the electrodes (electromigration) causes the ions to concentrate around the electrodes. As a result of the voltage placed across the first and second set of horizontal bore holes, some of the ions will have moved towards the first and second set of horizontal bore holes and can more easily be removed from the subsurface soil in a number of ways. A vacuum system can be used to apply a vacuum to the well bores so that volatized liquid and gases can be removed from the bore hole. Additionally or alternatively, a flushing system can be used that flushes out the horizontal bore holes with a non-contaminating purging fluid such as water.

The electromigration of the contaminants towards the electrodes extends the range around the bore holes that can be treated by soil vapor extraction and/or fluid purging. Fewer bore holes can be drilled and these bore holes placed further apart than they would have to be if electrokinetics was not used.

Because the electrode is formed by packing the annulus of the bore hole between the well screen and the bore of the hole with electrically-conductive particulate, such as granular carbon, the electrodes will be much larger than if steel rods or other conductive material alone were used for the electrode material.

In comparison to placing electrodes in the ground surface extending vertically down into the subsurface soil, by placing the electrodes horizontally a more uniform electrical field is created over the contamination zone and a larger area can be covered with less electrodes.

Alternatively, if the contaminant is not susceptible to an anode-cathode reaction, i.e. the contaminants will not be induced into electromigration, the same method can be used to heat the subsurface soil and increase the viscosity of some contaminants, such as hydrocarbons. Typically, the voltage placed across the electrodes is increased. The electrical voltage is then used to heat the subsurface soil between the electrodes, which will decrease the viscosity and/or increase the volatility of some types of contaminants. The heated contaminants will then be more susceptible to removal using a vapor extraction system, a multiphase vapor extraction or pump and treat system.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
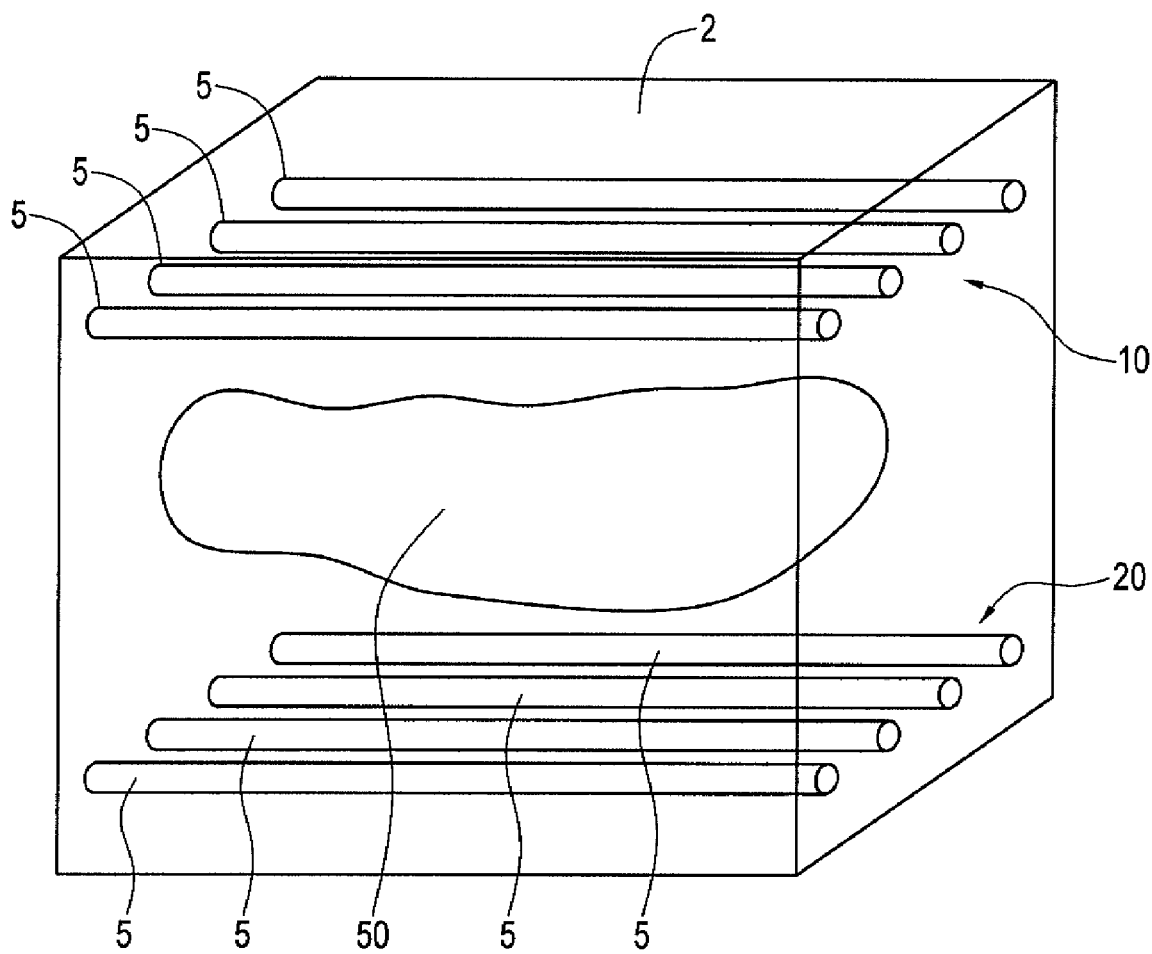
FIG. 1 is a perspective sectional view of a first set of horizontal bore holes and a second set of horizontal bore holes, in accordance with a first step of the present invention.

FIG. 1 illustrates a first step of a method for the treatment of contaminated subsurface soil, in accordance with the present invention. In this step, a first set of horizontal bore holes 10 and a second set of horizontal bore holes 20 are horizontally drilled using a horizontal boring tool 15. The first set of bore holes 10 are located beneath a ground surface 2 and oriented in a first horizontal plane. The second set of bore holes 20 are located below the first set of bore holes 10 in the subsurface soil and are oriented in a second plane. The second plane is substantially parallel to the first plane.

The first set of horizontal bore holes 10 and the second set of horizontal bore holes 20 are preferably located above and below a contamination zone 50, containing the contaminated soil, respectively. Alternatively, if the contamination zone 50 is too large to be effectively treated in one treatment, the contamination zone 50 could be treated in a number of stages by positioned the first set of bore holes 10 and the second set of bore holes 20 so that a first portion of the contamination zone 50 is located between the first set of horizontal bore holes 10 and the second set of horizontal bore holes 20 and then additional horizontal bore holes drilled at a later time to address the rest of the contamination zone 50.

The first step of the method is to drill the first set of horizontal bore holes 10 and the second set of horizontal bore holes 20, using a horizontal boring tool 15, as is commonly known in the art.

Figure 2:
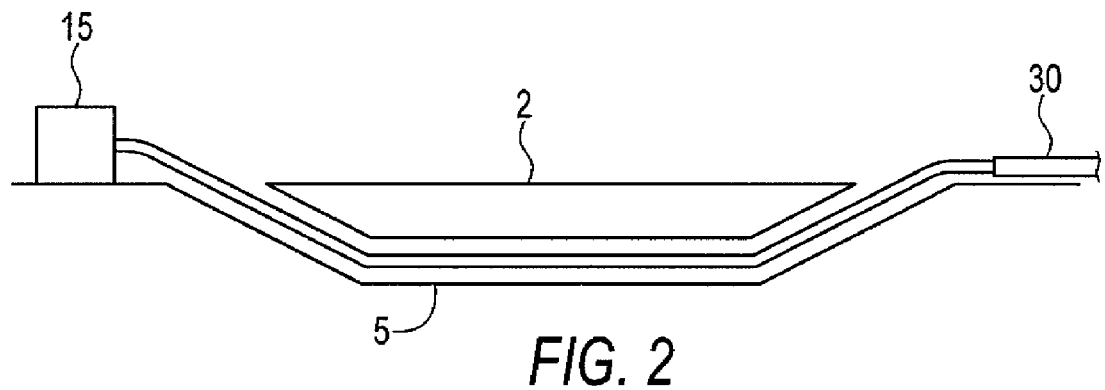
FIG. 2 is a side cross-sectional view of a horizontal bore hole being drilled and having a well screen positioned in the bore hole.

FIG. 2 illustrates a second step of the method of the present invention, wherein a well screen 30 is placed in each of the bore holes 5 in the first set of bore holes 10 and the second set of bore holes 20. When the horizontal boring tool 15 has bored a horizontal bore hole 5 and has resurfaced at a far end of a field being treated, a well screen 30 is attached to the end of the boring tool 15. The boring tool 15 is then retracted back through the bore hole 5. As the boring tool 15 is retracted back through the bore hole 5, the well screen 30 is dragged into place in the bore hole 5.

Figure 3:
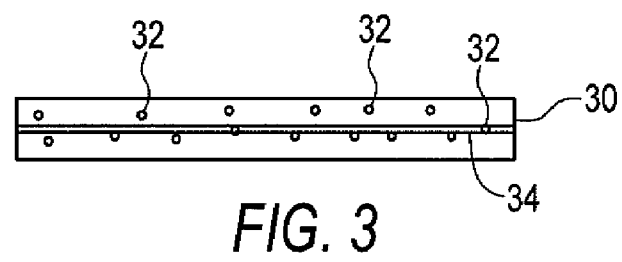
FIG. 3 is a side view of a well screen.

FIG. 3 illustrates a well screen 30. The well screen 30 is typically a PVC pipe with perforations 32 located along the length of the well screen 30. Additionally, an electrical conductor 34, such as a copper wire, is located running along the length of the well screen 30.

Referring again to FIG. 2, for each of the horizontal bores 5 in the first set of horizontal bore holes 10 and for each horizontal bores 5 in the second set of horizontal bore holes 20, when the boring tool 15 has resurfaced at the far side of the bore, a well screen 30 is attached to the end of the boring tool 15 and pulled into the bore hole 30, when the boring tool 15 is retracted.

When all of the bore holes 5 in the first set of bore holes 10 and all of the bore holes 5 in the second set of bore holes 20 have been drilled and the boring tool 15 removed, each of the bore holes 5 will have a well screen 30 passing through the bore hole 5.

Figure 4:
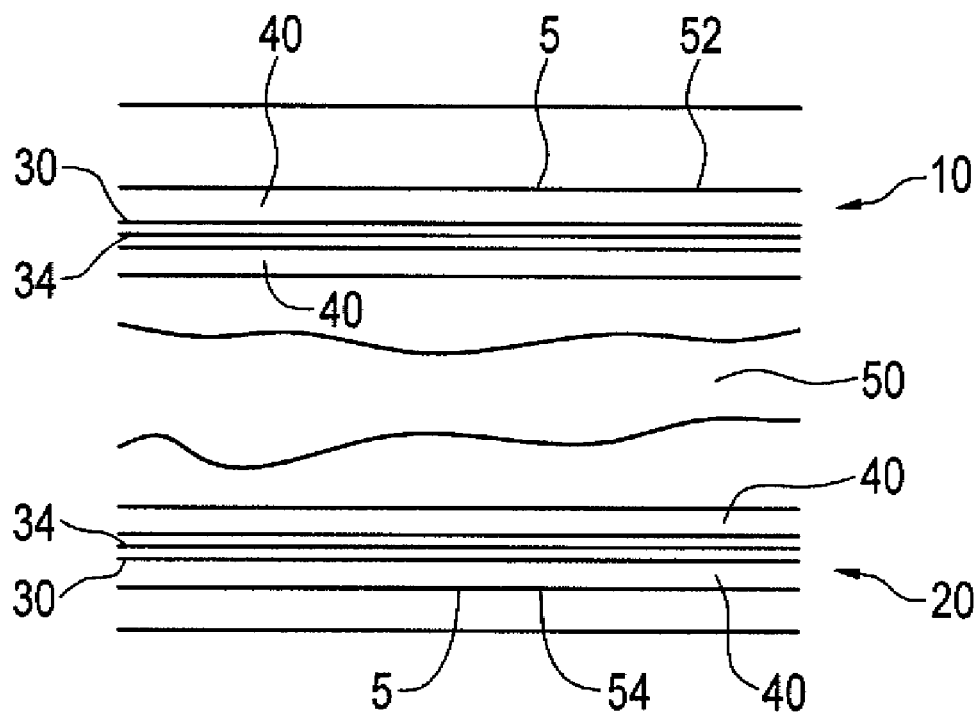
FIG. 4 is a side cross-section view of the bore holes of FIG. 2, wherein the annuluses of the bore holes are packed with an electrically-conductive granulate in accordance with the present invention.

FIG. 4 illustrates the next step of the method, wherein the annulus 40 of the bore holes 5 between the outer surface of the bore hole 5 and the well screen 30 is packed with an electrically-conducting particulate material 42, such as granular carbon. This electrically-conducting particulate material 42 is injected down the bore hole 5 into the annulus 30 of the bore hole 5.

Figure 5:
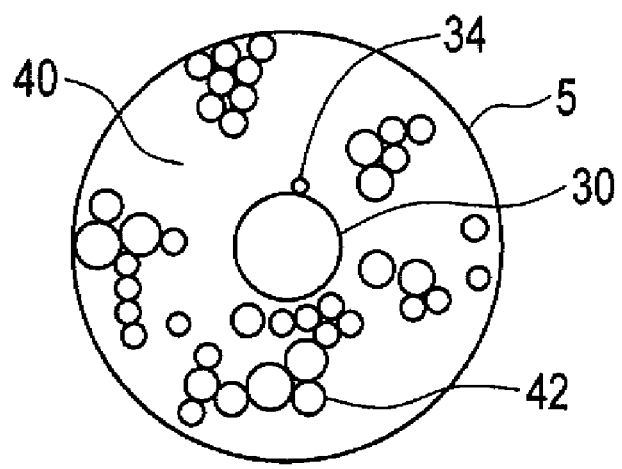
FIG. 5 is a cross-sectional view of a bore hole comprising a well screen and an annulus packed with electrically conductive granulate.

FIG. 5 is a cross-section view of a bore hole 5 with the well screen 30 and annulus 40 packed with the electrically-conducing particulate material 42.

Referring again to FIG. 4, packing the annulus 40 with electrically-conducting particulate material 42 allows the bore hole 5 to form an electrode.

Optionally, the electrical conductor 34 is used to carry an electrical charge through the entire length of the well bore 5 in the event that an air pocket in the electrically-conducing particulate material 42 is present which might prevent the electrical charge from traveling the entire length of the well bore 5.

Figure 6:
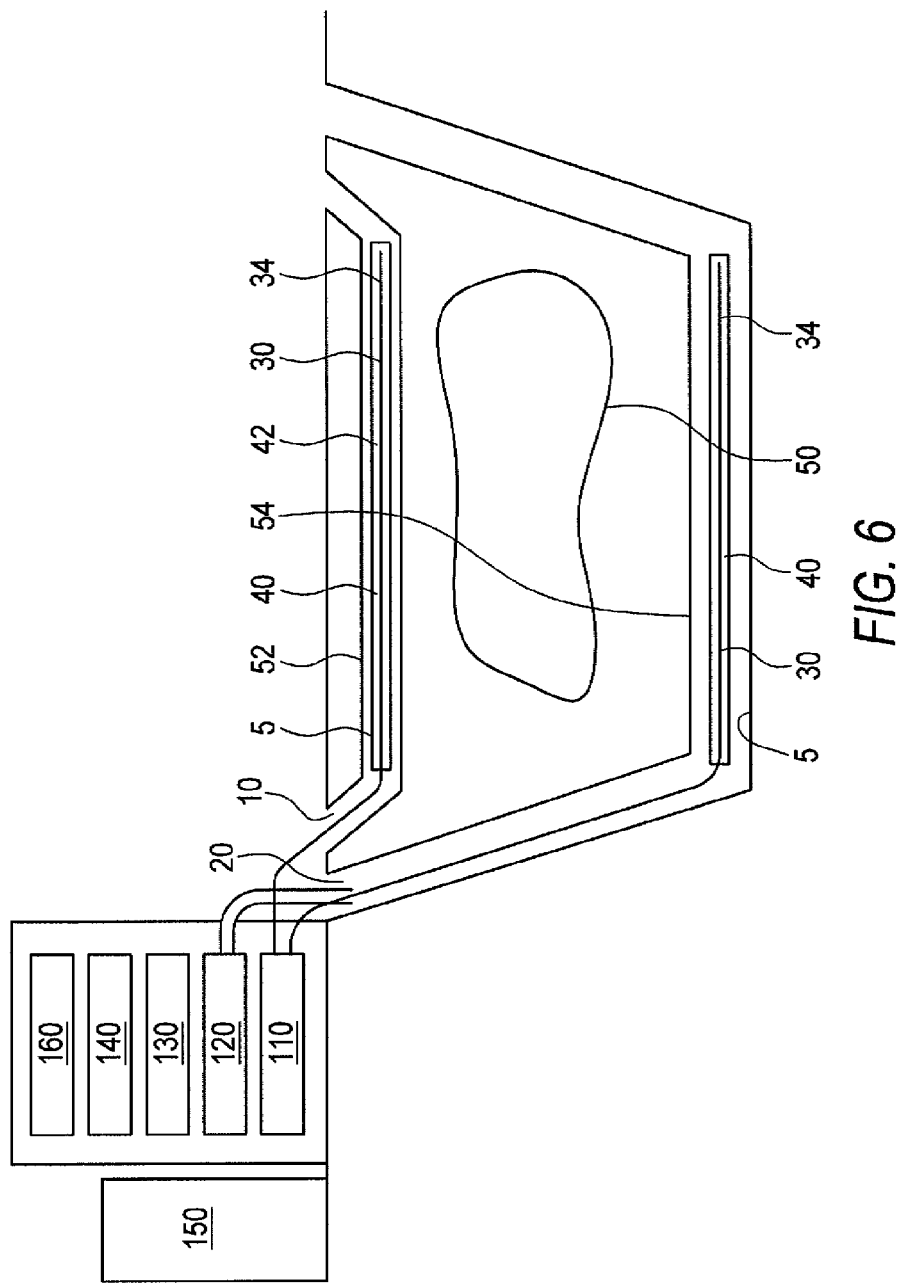
FIG. 6 is a schematic illustration of a side cross-sectional view of the upper and lower electrode with the treatment system in place, in accordance with the present invention.

FIG. 6 illustrates the system set up for operation. All of the bore holes 5 in the first set of horizontal bore holes 10 and the bore holes 5 in the second set of horizontal bore holes 20 have a well screen 30 and electrically-conductive particulate material 42 packed in the annulus 40 of the well bores 5, forming a set of upper electrodes 52 and lower electrodes 54, respectively.

A power delivery system 110 is connected across the upper electrodes 52 and lower electrodes 54. The power delivery system 110 supplies DC power across the electrodes formed by the upper electrodes 52 and the lower electrodes 54, with the upper electrodes 52 being negatively charged and the lower electrodes 54 being positively charged, or vice versa. By placing a charge across the electrodes using the power delivery system 110, an electrical field is created through the contaminated zone 50.

If the contaminant is salt, heavy metals, radionuclides or organic compounds, these types of contaminants can be induced to move towards the first set of horizontal bore holes 10 and the second set of horizontal bore holes 20 by imposing an electric field over the contamination zone 50. For example, when salt is the contamination material in the contamination zone 50 both sodium ions ($Na^+$) and chlorine ions ($Cl^-$) will exist in solution in the ground water. Under the imposed electrical field, the sodium ions ($Na^+$) migrate towards the cathode and the chloride ions ($Cl^-$) migrate towards the anode. The power delivery system 110 will be used to supply a current across the contamination zone 50 for a period of time. The longer the period of time, the more sodium ions ($Na^+$) and chlorine ions ($Cl^-$) that will migrate through the contamination zone 50 towards the electrodes 52, 54.

There are three phenonmenon that allow for the mobilization of contaminants in the soil: electromosis, electromigration and electrophoresis. Electromigration occurs when positively charged ions (cations) move toward the cathode (negative electrode) and negatively charged ions (anions) move toward the anode (positive electrode). However, electromosis and electrophoresis can also aid in removing contaminants from a soil region. Electromosis occurs when water and contaminants move from the anode to the cathode. Clay soil typically has negative surface charge; there is typically more cations than anions in the pore water. These extra cations, lined up along the pore walls and moving towards the cathode, drag the pore water along causing a net pore water flow to the cathode. This process can remove water from a section of soil and carry contaminants into an extraction area. Electrophoresis is the movement of particles or colloids under the influence of the electric field. If particles carry a net surface charge, they can be transported through the soil matrix by passing an electric current through the soil.

Alternatively, if the contaminant in the contamination zone 50 is not salt, a heavy metal, a radionuclide, organic compounds or other substance that will be induced into electromigration as a result of the electrical field, the system can also be used to heat up the contaminant in the contamination zone 50 to decrease the viscosity and/or increase the volatility of the contaminant. For example, hydrocarbons could be the contaminant and the electrical field is used to heat up the contamination zone 50. By heating the hydrocarbon in the contamination zone 50, the hydrocarbon can be more easily removed from the surrounding sub-surface soil using vapor extraction and flushing methods.

Next, a vacuum system 120 is used to extract volatized liquid from the bore holes 5. The vacuum system 120 comprises a vacuum source used for vapor extraction such as a multi-phase vapor extraction system. The vacuum system 120 is used to apply a vacuum to the bore hole 5. A vacuum source is applied to one end of each of the bore holes 5 to extract vapor from the bore holes 5. Vapor, including volatized contaminant and partially volatized contaminant from the bore hole 5 and sub-surface soil surrounding the bore hole 5, is extracted from the bore hole 5 as a result of the pressure differential created by the vacuum system 120.

Figure 7:
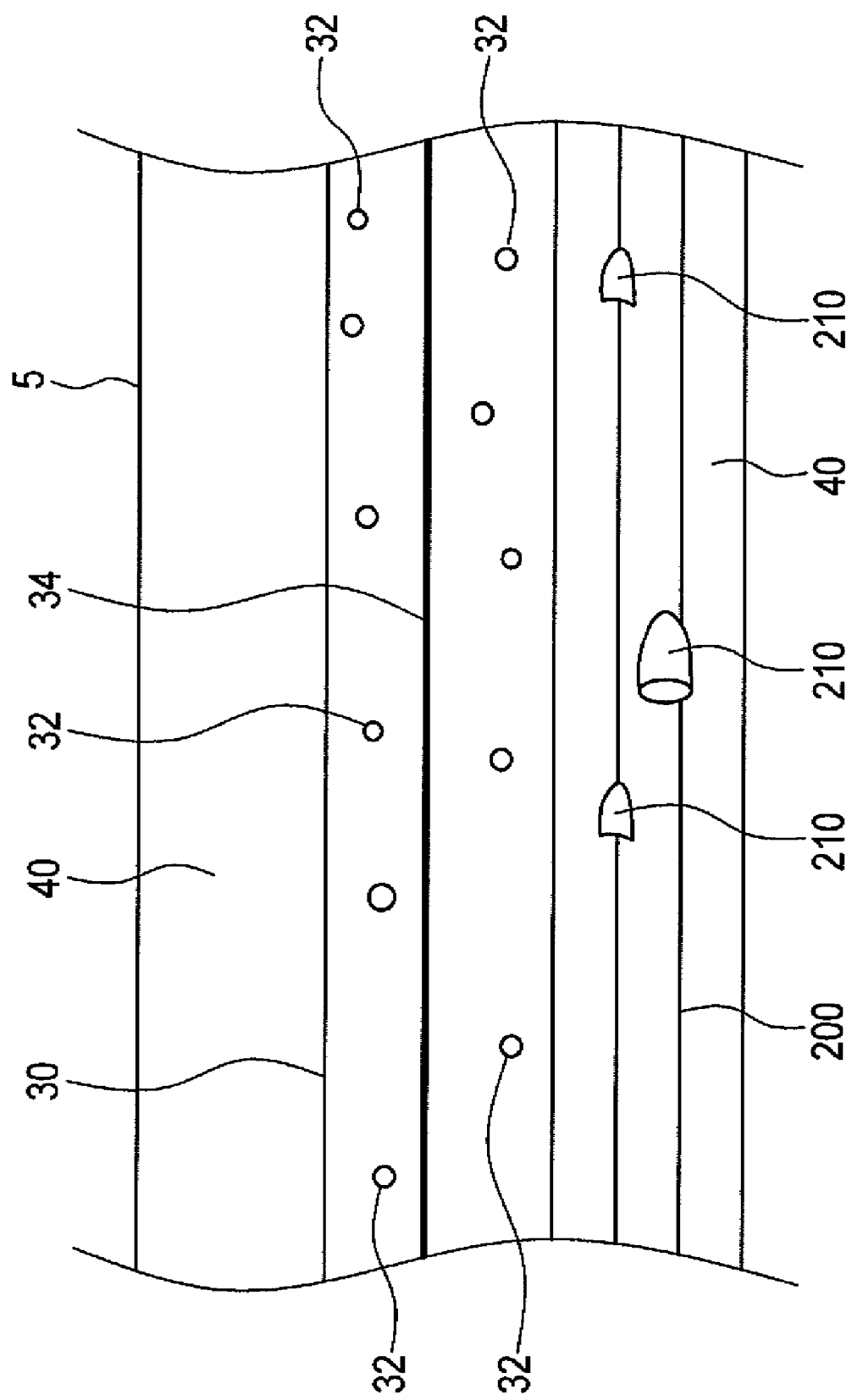
FIG. 7 is a cross-section of a bore hole containing a fluid conduit as part of a pneumatic air lift system.

A pneumatic air lift system 130 is used to increase the pressure differential created by the vacuum system 120 and extend the effective range of the vacuum system 120, allowing more volatized and partially volatized contaminants to be removed from the bore holes 5. The pneumatic air lift system 130 comprises an air supply and a fluid conduit that runs through the bore holes 5. FIG. 7 illustrates a cross-section of a bore hole 5 with a fluid conduit 200 passing through it. The fluid conduit 200 has a plurality of reversing ports 210 located along the fluid conduit 200 at regular intervals. Pressurized air is forced through the fluid conduit 200 where it exits the reversing ports 210 forcing fluid in the bore hole 5 back towards the vacuum system 120.

Referring again to FIG. 6, a flushing system 140 can also or alternatively be used to flush contaminants out of the bore hole 5 and the surrounding soil. Non-contaminating purging fluid, such as clean water is used to flush out the bore hole 5 (although the purging fluid can have chemicals or biological agents added to further act on the contaminants). The purging fluid is forced into the bore holes 5 and then extracted to remove contaminant in the bore hole 5 or around the bore hole 5, from the surrounding subsurface soil.

The purging fluid can be temporarily stored onsite until it is removed for treatment at an offsite location to remove the contaminant in the used purging fluid, or alternatively, a descaler 150 or other water treatment system is provided. The recovered purging fluid that is extracted from the bore holes 5 can be routed to the descaler 150 where the descaler 150 will clean a substantial portion of the contaminant from the water. The treated purging fluid can then be reused by the flushing system 140.

Optionally, further systems can be incorporated to increase the permeability of the sub-surface soil, such as a pneumatic fracturing system 160. The pneumatic fracturing system 160 forces a burst of air down the bore holes 5 to create cracks in the subsurface soil surrounding the bore holes 5. The fractures in the subsurface created by the pneumatic fracturing system 160 increase the permeability of the subsurface soil.

The power supply system 110, vacuum system 120 and flushing system 140 can be repeatedly used in stages with the system used in series one after another repeatedly, until a satisfactory amount of contaminants have been removed from the contamination zone 50.

Additionally, in some circumstances it may not be necessary or desirable to use the horizontal bore holes. Rather, more conventional vertical bore holes can be used with the conductive-material packed annulus in some circumstances.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention

We claim:

1. A method for in-situ soil remediation, the method comprising:
   placing a first electrode below a ground surface, the first electrode extending substantially horizontally;
   placing a second electrode below the first electrode, the second electrode extending substantially horizontally, soil between the first electrode and second electrode containing contaminants; and
   passing an electric current between the first electrode and second electrode through the soil between the first electrode and second electrode, using the first electrode and second electrode, the first electrode having opposite charge from the second electrode, to induce mobilization of contaminants in the soil between the first electrode and second electrode towards at least one of: the first electrode and second electrode.

2. The method of claim 1 wherein the second electrode extends substantially parallel to the first electrode.

3. The method of claim 2 wherein the first electrode is one of a first set of electrodes positioned in a first plane oriented substantially horizontally below the ground surface and the second electrode is one of a second set of electrodes positioned in a second plane oriented substantially horizontal and below and substantially parallel to the first plane.

4. The method of claim 2 wherein first electrode and second electrode are positioned under the ground surface by boring a first bore hole and positioning the first electrode in the first horizontal bore hole and boring a second horizontal bore hole below the first bore hole and positioning the second electrode in the second bore hole.

5. The method of claim 4 wherein the first electrode and second electrode are formed by inserting electrically conductive particulate matter in the first bore to form the first electrode and inserting electrically conductive particulate matter in the second bore hole to form the second electrode.

6. The method of claim 5 wherein the electrically conductive particulate matter is granular carbon.

7. The method of claim 4 wherein the first electrode is positioned in the first horizontal bore hole by placing a permeable first well screen in the first bore hole, a cross-sectional area of the first well screen being less than a cross-sectional area of the first bore hole, and filling an annuls formed between the first well screen and the first bore hole with electrically conductive particulate matter to form the first electrode and the second electrode is positioned in the second horizontal bore hole by placing a permeable second well screen in the second bore hole, a cross-sectional area of the second well screen being less than a cross-sectional area of the second bore hole, and filling an annuls formed between the second well screen and the first bore hole with electrically conductive particulate matter to form the second electrode.

8. The method of claim 7 wherein the first electrode is one of a first set of electrodes positioned in a first plane oriented substantially horizontally below the ground surface and the second electrode is one of a second set of electrodes positioned in a second plane oriented substantially horizontal and below and substantially parallel to the first plane.

9. The method of claim 7 wherein the first well screen and second well screen each comprise a PVC pipe containing a plurality of perforations.

10. The method of claim 7 wherein the first well screen and second well screen further comprise an electrical conductive wire running along an outside surface of the well screen.

11. The method of claim 7 wherein the electrically conductive particulate matter is granular carbon.

12. The method of claim 7 wherein the contaminants are mobilized towards at least one of: the first electrode; and the second electrode, by at least one of: electroosmosis; electromigration; and electrophoresis.

13. The method of claim 7 wherein the contaminant is salt and the electric current induces electromigration in the soil between the first electrode and the second electrode.

14. The method of claim 7 wherein the contaminant is a metal having an ionic charge and the electric current induces electromigration in the soil between the first electrode and second electrode.

15. The method of claim 7 wherein the contaminant is induced to mobilize by the electric current increasing the temperature of the soil, decreasing the viscosity of the contaminant.

16. The method of claim 15 wherein the contaminant is hydrocarbon.

17. The method of claim 7 further comprising extracting contaminants from the area surrounding the first electrode and the second electrode.

18. The method of claim 17 wherein contaminants are extracted from the area surrounding the first electrode and the second electrode by applying a vacuum source to a first end of the first bore hole and a first end of the second bore hole to create a pressure differential between the first bore hole and the vacuum source and the second bore hole and the vacuum source, the pressure differential causing at least partially volatized contaminant from the first bore hole and second bore hole to move towards the vacuum source.

19. The method of claim 18 wherein the pressure differential between the vacuum source and the first and second bore hole is increased by increasing the pressure in the first bore hole and second bore hole.

20. The method of claim 19 wherein the pressure differential between the vacuum source and the first bore hole and the vacuum source and the second bore hole by placing a fluid conduit in each of the first bore hole and second bore hole, the fluid conduit having apertures passing out of the fluid conduit, and forcing pressurized fluid through the fluid conduit and out the apertures in the fluid conduit.

21. The method of 20 wherein the apertures in the fluid conduit are directed down the first bore hole and second bore hole towards the vacuum source.

22. The method of claim 17 wherein contaminant surrounding the first electrode and second electrode is extracted by pumping purging fluid into the first bore hole and second bore hole and then removing the purging fluid along with contaminants from the first bore hole and second bore hole.

23. The method of claim 17 wherein pneumatic fracturing is used to increase the permeability of soil surrounding at least one of: the first bore hole and second bore hole.

24. A method for in-situ soil remediation, the method comprising:
horizontally boring a first bore hole below a ground surface, the first bore hole extending substantially horizontally;
horizontally boring a second bore hole below the first bore hole, the second bore hole extending substantially parallel to the first bore hole, soil between the first bore hole and second bore hole containing contaminants;
inserting a first well screen in the first bore hole, a cross-sectional area of the first well screen being less than a cross-sectional area of the first bore hole;
inserting a second well screen in the second bore hole, a cross-sectional area of the second well screen being less than a cross-sectional area of the second bore hole;
filling an annuls formed between the first well screen and the first bore hole with electrically conductive particulate matter to form a first electrode;
filling an annuls formed between the second well screen and the first bore hole with electrically conductive particulate matter to form a second electrode; and
passing an electric current between the first electrode and second electrode through the soil between the first bore hole and second hole, the first electrode having opposite charge from the second electrode, to induce mobilization contaminants in the soil between the first electrode and second electrode towards at least one of: the first electrode and second electrode.

25. The method of claim 24 wherein the first electrode is one of a first set of electrodes positioned in a first plane oriented substantially horizontally below the ground surface and the second electrode is one of a second set of electrodes positioned in a second plane oriented substantially horizontal and below and substantially parallel to the first plane.

26. A method of constructing an electrode for electrokinetic in-situ remediation of soil with an expanded cross-section, the method comprising:
creating a bore hole through soil beneath a ground surface;
inserting a well screen in the bore hole, the well screen having a cross-section that is less than a cross-section of the bore hole; and
filling an annulus formed between the an outside surface of the well screen and an inner surface of the bore hole with a electrically-conductive granular material.

27. The method of claim 26 wherein the electrically conductive particulate matter is granular carbon.

28. The method of claim 26 further comprising running an electrically conductive wire along the outside surface of the well screen.

29. The method of claim 26 wherein the bore hole is oriented parallel to the ground surface.

30. The method of claim 26 wherein the bore hole is oriented perpendicular to the ground surface.

31. A method of extracting at least partially volatized contaminants from a bore hole, the method comprising:
inserting a fluid conduit into the bore hole, the fluid conduit having apertures passing out of the fluid conduit;
providing a vacuum source at a first end of the bore hole to create a pressure differential between the vacuum source and an interior of a bore hole; and
increasing the pressure differential by forcing pressurized fluid through the fluid conduit and out the apertures into the bore hole;
wherein the pressure differential moves at least partially volatized contaminants towards the vacuum source.

32. The method of claim 31 wherein the apertures in the fluid conduit are directed towards the vacuum source.

* * * * *